Figure 5:
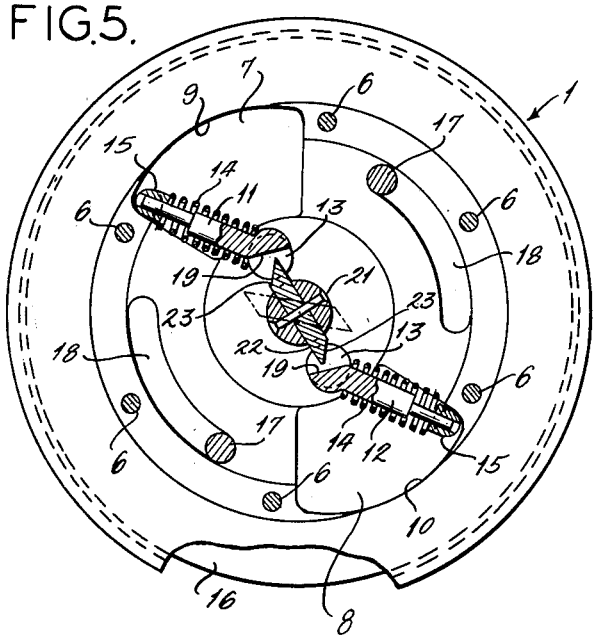

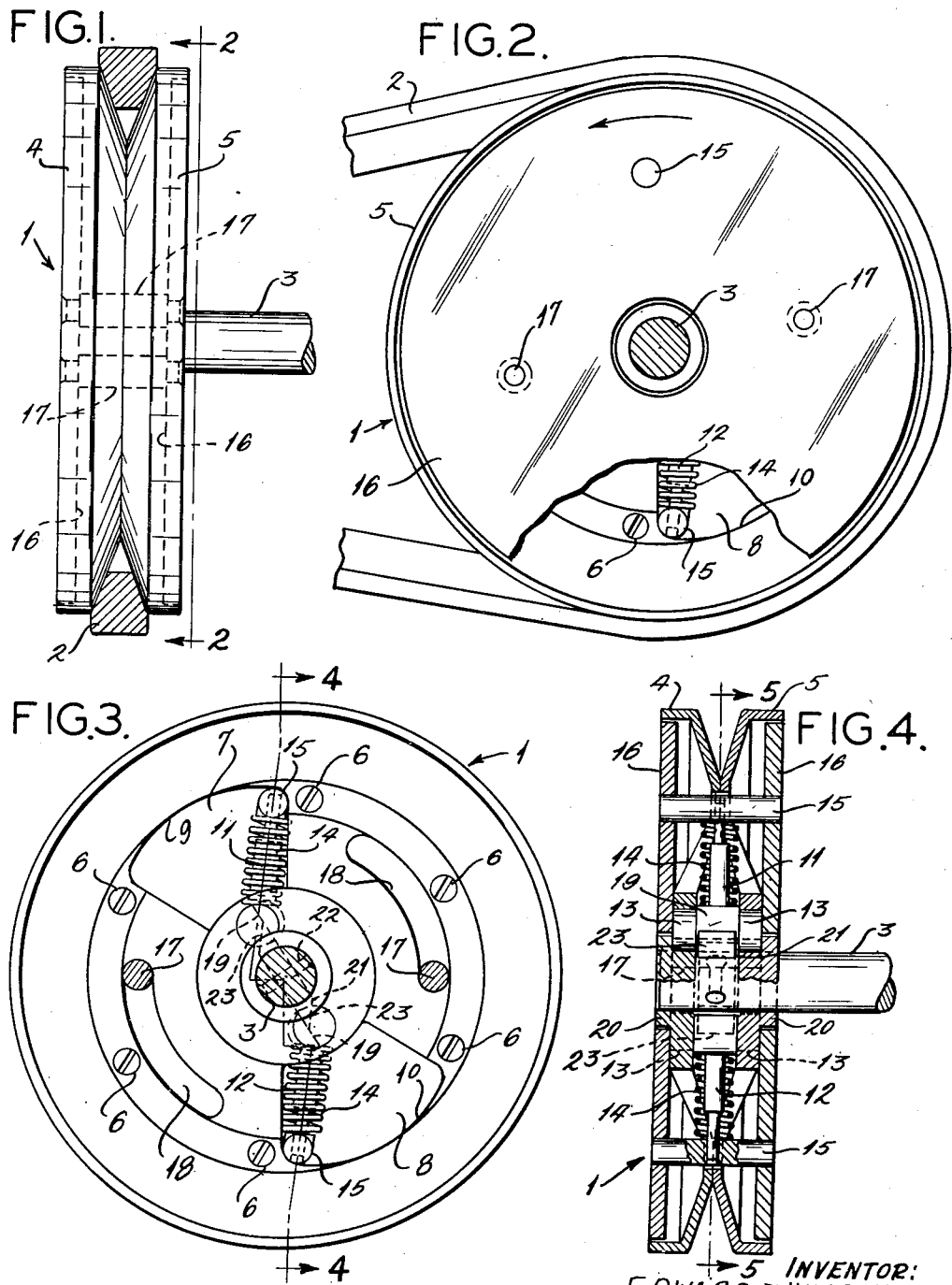

April 19, 1955  E. THOMSON  2,706,546
SHOCK LOAD RELEASE CLUTCH
Filed Feb. 28, 1951  2 Sheets-Sheet 2

INVENTOR:
EDWARD THOMSON
By Cau+Cau & Gravely,
ATTORNEYS.

United States Patent Office 2,706,546
Patented Apr. 19, 1955

2,706,546

SHOCK LOAD RELEASE CLUTCH

Edward Thomson, Ashley, Ill.

Application February 28, 1951, Serial No. 213,178

8 Claims. (Cl. 192—56)

This invention relates to clutches and is more particularly directed to a clutch that is disengaged when a shock load is imposed thereon.

One of the objects of the invention is to provide a clutch for a transmission system that will be released instantly when a sudden load is imposed on the machine in which the clutch is installed.

Another object of the invention is to provide a mechanism for a shock load release clutch that will permit it to be easily and quickly reset.

This invention consists in the provision of a shaft mounted driving member for a clutch that cooperates with the driven member, including one or more inertia devices acting on pawls rotatably mounted in the driven member and held in place by springs carried thereby, each of the pawls being provided with slots cooperating with a shaft mounted bar having parallel angular faces, the bar engaging the pins when the clutch is in engaged position and disengaged from the pins when the clutch is in disengaged position.

Figure 7:
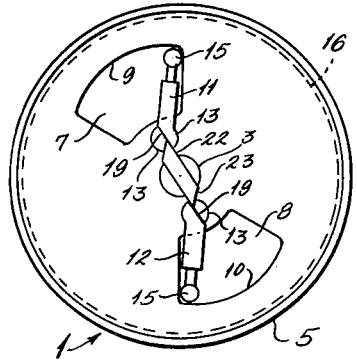
Figure 6:
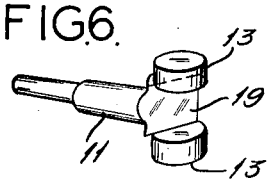
Figure 8:
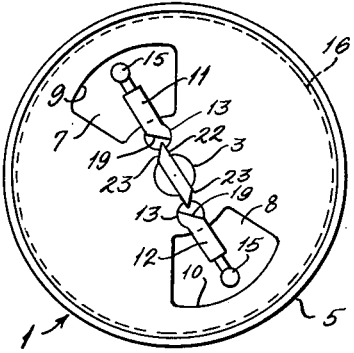
Figure 10:
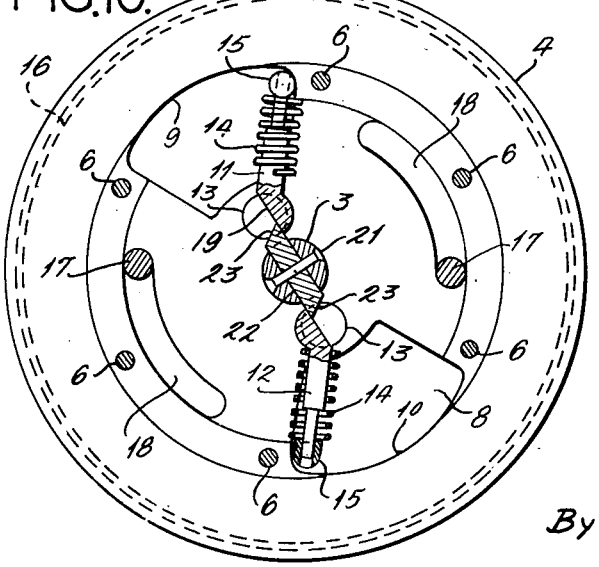
Figure 9:
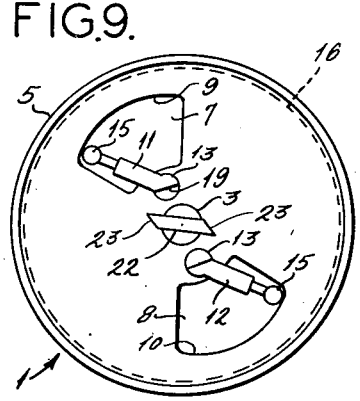

In the drawings:

Fig. 1 is a side elevational view of one embodiment of the invention,

Fig. 2 is an end view looking in the direction of the line 2—2 of the device shown in Fig. 1, a part being broken away to show detail, Fig. 3 is a view similar to Fig. 2, one of the parts being removed to show detail, Fig. 4 is a sectional view taken substantially along the line 4—4 of Fig. 3, Fig. 5 is a sectional view taken substantially along the line 5—5 of Fig. 4, Fig. 6 is a perspective view of one of the parts of the clutch, Figs. 7, 8 and 9 show different operating positions of the movable parts of the device; and Fig. 10 is a view similar to Fig. 5, showing a modified form of the invention.

This invention is embodied in the device illustrated in the several views of the drawings in which the numeral 1 designates the driving member of the clutch about which a belt 2 is disposed for transmitting power derived from a suitable power source to a shaft 3. The shaft 3 constitutes the driven member of the clutch and both may be rotated relative to each other after shaft 3 has a shock load imposed thereon, suitable mechanism being provided for effecting disconnection of the two members.

The driving member comprises a pair of suitably shaped discs 4 and 5 forming a V-shaped pulley at the periphery thereof and spaced apart to form a hub for the clutch midway between the periphery and the rotational axis thereof, the discs being brought together and clamped by a plurality of screws 6.

The discs 4 and 5 have openings 7 and 8 respectively cut therein, and the peripheral surfaces 9 and 10 of these openings 7 and 8 respectively are curved surfaces constructed as arcs of a circle with its center in the axis of the driven member or shaft 3.

Each of the discs 4 and 5 has a hub portion in which pawls 11 and 12 are rotatably supported, one end of each pawl being rotatably supported in each disc. Each pawl comprises a pair of heads 13 one head rotatably supported in each of the discs. Connected between the heads of each pawl is a member having a plane surface 19 formed thereon, and extending outwardly therefrom is a shank that swings through the openings in the discs 4 and 5. A pin 15 is slidably received on the outer end of each shank and a spring 14 is disposed between the pin 15 and the connecting portion on which surface 19 is formed.

A pair of inertia discs 16 is disposed within the flanges of discs 4 and 5 for rotation with the discs or relative thereto as will be more particularly described later in the specification. The discs 4 and 5 have hubs formed thereon which receive the inertia discs. The inertia discs are held in position on the discs 4 and 5 by pins 17 that extend through arcuate slots 18 cut in discs 4 and 5. The reason for the arcuate slots is to permit relative rotation of inertia discs 16 and the discs 4 and 5. The pins 15 are also supported in each of the inertia discs but not anchored thereto because there must be a small amount of rotative motion of the pins relative to the inertia discs.

The driven member, which includes shaft 3, extends through hubs 20 on discs 4 and 5 and are normally in alignment with the inertia discs 16. A bar 22, in the form of a parallelogram extends through the shaft and is secured therein by a rivet 21 or other suitable securing means. The pointed ends or dogs 23 of the bar are received in the space of which the surface 19 forms the base that is the engaging and disengaging means of the clutch.

During the operation of the device, it is assumed that the driving and driven members are in engagement with each other, as shown in Fig. 3; and that driven member 3 has encountered a shock load. The shock load is one of the type wherein the rotation of driven member 3 is arrested or so sharply reduced that the inertia discs 16 will continue normal rotation. Since the inertia discs are connected to the pawls 11 and 12 by means of pins 15, they will rotate or swing relative to the discs 4 and 5. Still assuming that the direction of rotation of the discs 4 and 5 is counterclockwise as viewed in Fig. 3 and the shock load having been imposed, the discs 4 and 5 and member 3 will be affected. Inertia discs 16 will continue rotation and in so doing will move the outer ends of the shanks of pawls 11 and 12 along with them in openings 7 and 8. The inertia discs rotating about the axis of driving member 3 will swing the outer ends of the shank about the same axis while rotating the heads 13 and connecting part of the pawls about the axis of the heads. During the first part of the motion of the inertia discs and pawls relative to discs 4 and 5, it will compress springs 14 until approximately one-half of the distance through the openings 7 and 8 has been traversed. The spring compresses by reason of the fact the pin 15 moves radially inward of discs 4 and 5 along the shank of the pawls because of the different axes about which heads 13 rotate and the inertia discs rotate, the axis of swing or rotation of pawl 11 being displaced from the axis of rotation of discs 4 and 5. As soon as the mid-point of the travel has been reached the springs begin to expand and assist in completing the relative motion of discs 4 and 5 and inertia discs 16. This action constitutes the over-center operation of the clutch. At this time the parts will be in the position indicated in Fig. 5 wherein the driving member rotates relative to the driven member 3. The position of surface 19 on the pawls and length of the dogs is such that they will clear thereby permitting the driving and driven members to rotate relative to each other. The clutch is reengaged by manually reversely rotating the inertia discs relative to discs 4 and 5.

In view of the foregoing it is clear that the pawls 11 and 12 are provided with spring actuated toggle means for holding the pawls in predetermined positions for engagement or disengagement of the driving and driven members. The inertia means 16 constitute the actuators for the toggles, and it is obvious that disengagement is automatic when resistance is encountered because of the continued motion of the inertia means. During operation to disengage, the springs 14 will yield as pins 15 slide inwardly on the arms of pawls 11 and 12 until the mid-position is reached. Thereafter, the springs will urge pins 15 outwardly to its normal given position.

Fig. 10 shows a construction similar to that described above in which the spring 14 on pawls 11 and 12 has a different rate than the spring in the Fig. 3 disclosure so that the clutch will not only respond to a shock load, but will also act as a torque release clutch. Bar 22 is somewhat shorter than the disclosure shown in Figs. 1 through 5, thereby causing the inertia discs to rotate counter-clockwise (Figs. 7 and 9) when shaft 3 is subjected to a torque load of a predetermined or higher value. The included angle of the ends of bar 22 is greater than that of the corresponding bar shown in Fig. 5. These pointed ends are not essential to the operation of the device of Figs. 5 and 10, but they simply increase the efficiency of the operation of the clutch. The operation of this mechanism is otherwise identical with that described above.

What I claim is:

1. A clutch comprising a driving member and a driven member, a member pivotally mounted in said driving member for movement between engaged and disengaged positions, inertia means supported on said driving member, means on said driven member engageable with said pivotally mounted member in its engaged position; and toggle action means on said pivotally mounted member adapted to hold said latter member in either of its positions and adapted for connecting said inertia means and said pivotally mounted member so that upon relative rotation of said inertia means and said driving member said driven member and said pivoted member will be disengaged.

2. A clutch comprising a driving member, pawls pivotally mounted in said driving member and each having an angular surface thereon, inertia means on said member capable of rotation relative to said driving member, toggle action means on said pawls adapted for connecting said pawls and said inertia means and acting to urge said pawls into engaged or disengaged positions, a driven member; and means on said driven member engageable with said surfaces in said engaged position of said pawls for causing the members to rotate together and disengageable with said surfaces when the latter are rotated by said inertia means and urged into disengaged positions, thereby permitting said driving and driven members to rotate relative to each other.

3. A clutch comprising a driving member having a hub and spaced apertures therein, a pawl rotatably mounted in said hub opposite each aperture and extending thereinto, each pawl having an angular surface thereon, a driven member, a bar having pointed ends secured to said driven member, the ends of the bar being engageable with said pawl surfaces for causing said driving member to rotate said driven member; and inertia means movable relative to said driving member and connected to said pawls for moving said pawls in said apertures for disengaging said bar from the surfaces of said pawls, thus permitting said driving and driven members to rotate relative to each other.

4. A clutch comprising a driving member provided with a plurality of adjacent apertures and openings therein, a pawl rotatably mounted in each aperture in said driving member and extending into said adjacent opening, each pawl normally disposed at one margin of its associated opening, each pawl having an angular surface thereon, spring actuated toggle means on each pawl for holding said pawl on one side or the other of said opening, a driven member including a shaft, a dog secured in said shaft and engageable with the surface on each pawl for rotating said driven member; and inertia means connected to said spring actuated toggle means for said pawls for moving the pawls to the opposite margin of their respective openings, thereby causing said driven member to be disengaged from said surfaces and permitting said driving and driven members to rotate relative to each other.

5. A clutch comprising a driving member and a driven member, a member pivotally mounted in said driving member, inertia means supported on said driving member, means on said driven member engageable with said pivotally mounted member; and spring actuated toggle means for connecting said inertia means and said pivotally mounted member so that upon relative rotation of said inertia means and said driving member said driving member and said pivoted member will be disengaged and said pivoted member held in disengaged position.

6. A clutch comprising a driving member, pawls pivotally mounted in said driving member and each having an angular surface thereon, inertia means movably carried on said driving member capable of rotation relative to said driving member, relatively movable arm and pin means connecting said pawls and said inertia means, a driven member, a spring on each arm means for holding said pin means in a given position of engagement with said inertia means; and means on said driven member engageable with said angular surfaces for causing the driving and driven members to rotate together and when said angular surfaces are rotated by said inertia means said surfaces will be disengaged from said last mentioned means, thereby permitting said driving and driven members to rotate relative to each other.

7. A clutch comprising a driving member having a hub and spaced openings therein, a pawl rotatably mounted in said hub opposite each opening and extending thereinto, each pawl having an angular surface thereon, a spring on each pawl for holding same on one side or the other of the opening, a driven member, a bar secured to said driven member, the ends of the bar being engageable with said pawl surfaces for causing said driving member to rotate said driven member; and inertia means loosely carried by the clutch and movable relative to said driving member when the driving member encounters a shock load and connected to said pawls for moving said pawls in said openings for disengaging said bar from the surfaces of said pawls, thus permitting said driving and driven members to rotate relative to each other.

8. A clutch comprising a driving member having a plurality of diametrically disposed openings and apertures therein, a pawl pivotally mounted on said driving member in each aperture, inertia means rotatably mounted on said driving member, spring pressed pin means connecting each of said pawls and said inertia means, said spring pressed pin means on each pawl being adapted for holding said pin means positioned at one side or the other of its opening, a driven member; and means on said driven member engageable with said pawls to effect a driving connection for causing said driving member to rotate said driven member, said last stated means and said pawls being disengageable upon said inertia means rotating relative to said driving member to pivot said pawls.

References Cited in the file of this patent

UNITED STATES PATENTS

| 1,125,646 | Campbell | Jan. 19, 1915 |
| 1,713,909 | Marchev | May 21, 1929 |

FOREIGN PATENTS

| 219,975 | Great Britain | July 25, 1924 |